(12) United States Patent
Leja et al.

(10) Patent No.: US 6,871,416 B2
(45) Date of Patent: Mar. 29, 2005

(54) ECCENTRICITY AND WOBBLE SENSING DEVICE

(75) Inventors: Joseph W. Leja, Blue Island, IL (US); Louie R. D'Orazio, Ingersoll (CA)

(73) Assignee: Canyon Street Crossing, LLC, Boulder, CO (US)

( * ) Notice: Subject to any disclaimer, the term of this patent is extended or adjusted under 35 U.S.C. 154(b) by 393 days.

(21) Appl. No.: 10/223,413

(22) Filed: Aug. 19, 2002

(65) Prior Publication Data

US 2003/0038724 A1 Feb. 27, 2003

Related U.S. Application Data

(60) Provisional application No. 60/313,637, filed on Aug. 20, 2001, and provisional application No. 60/327,549, filed on Oct. 5, 2001.

(51) Int. Cl.[7] .......................... G01B 5/252; G01B 5/20
(52) U.S. Cl. ..................... 33/550; 33/501.02; 33/533
(58) Field of Search ................. 33/203, 533, 501.02, 33/501.03, 543, 546, 549–555, 572

(56) References Cited

U.S. PATENT DOCUMENTS

| | | | | |
|---|---|---|---|---|
| 659,368 A | * | 10/1900 | Haberlin et al. | 33/533 |
| 1,769,129 A | * | 7/1930 | Graham | 33/554 |
| 4,050,293 A | * | 9/1977 | Shimomura et al. | 33/501.02 |
| 4,590,869 A | | 5/1986 | Steilen | 111/88 |
| 4,903,413 A | * | 2/1990 | Bellwood | 33/551 |
| 5,231,767 A | * | 8/1993 | Brinley | 33/533 |
| 5,337,485 A | * | 8/1994 | Chien | 33/550 |
| 5,678,963 A | * | 10/1997 | Heimann | 33/555 |
| 6,195,905 B1 | * | 3/2001 | Cole | 33/533 |
| 6,796,036 B1 | * | 9/2004 | Klarer | 33/203 |
| 2002/0095808 A1 | * | 7/2002 | Takahashi | 33/551 |

* cited by examiner

Primary Examiner—G. Bradley Bennett
(74) Attorney, Agent, or Firm—Levenfeld Pearlstein; Leon I. Edelson; William C. Clarke

(57) ABSTRACT

A wobble and eccentricity sensing device is provided for use with a planter blade. The device includes a stand having a shaft adapted to mount the planter blade thereon for rotational movement of the planter blade about the shaft. A wobble indicator is coupled to the stand to measure the concavity of the planter blade as the planter blade rotates at least one revolution about the shaft. The wobble indicator is adapted to contact a face of the planter blade. An eccentricity indicator is also coupled to the stand and is adapted to contact an outer edge of the planter blade to measure the eccentricity of the planter blade as the planter blade rotates at least one revolution about the shaft.

21 Claims, 3 Drawing Sheets

ECCENTRICITY AND WOBBLE SENSING DEVICE

This application claims priority under 35 U.S.C. 119(e) to U.S. Provisional Application Ser. Nos. 60/313,637, filed Aug. 20, 2001 and 60/327,549 filed Oct. 5, 2001, each of which is expressly incorporated by reference herein.

BACKGROUND AND SUMMARY

The present disclosoure relates generally to a device with provisions for mounting test subjects, such as agricultural planter disc blades and planter disc blade assemblies, and one or more movable sensor systems for sensing qualities relative to the test subject, and simultaneously capturing the data via statistical process software and a dedicated computer.

For over 100 years, farm planter disc blade manufacturers have competed to provide consumers with the best products and service possible. Consumers, mainly farm implement retailers and agricultural farmers, have emphasized the importance of planter disc blades that are consistent in their specifications and set standards for longevity, wearability, and performance. In constructing such a product, disc blade manufacturers have realized the importance of maintaining high standards of quality assurance and control ("QA/QC") during manufacturing processes. Particularly, when using planter disc blades in a v-shaped configuration to create furrows in soil, the blades should have uniform and consistent dimensions to guard against the possibility of collision between the two angulated disc blades. Such a collision may damage the planter disc blades and alter their revolutions, thus hindering any expectancy of furrows of consistent depth and width. Therefore, if consumers can be assured that the disc blades they purchase have uniform and consistent dimensional characteristics and produced to within the required specifications, they will return as customers.

Disc blades of the highest quality take on unique physical characteristics of the raw steel used and special manufacturing processes, such as heat treating. Thus, high quality blades will be unique in shape, concavity, and diameter and will have a uniform radial revolution ("eccentricity") without undue side-to-side movement ("wobble"). In the past, the only way for disc blade manufacturers to insure the batch-by-batch uniformity and consistency of its blades were to test the disc blades by hand, using a caliper, which was time-consuming, inefficient, and ultimately costly. Additionally, a lack of a "control" to analyze against caliper-measured eccentricity and wobble values prevented consumers from receiving a guarantee of the qualities of the disc blades they purchased.

Manufacturers of farm equipment, specifically disc blades, have come to realize that an automated form of testing for eccentricity and wobble, combined with automated data acquisition, and separate manual recording or keyed data, would be more time efficient, exact, and consistent, thus increasing performance and quality assurance. Specifically, by using a device comprising a stand for the mounting of disc blades and at least one adjustable sensor assembly indicator, such as a Mitutoyo Digimatic Indicator (available from Mitutoyo America Corporation, Aurora, Ill.), the details of which are herein incorporated by reference, statistical data concerning the QA/QC of disc blades can be achieved efficiently, exactly, and uniformly, serving to increase consumer satisfaction and performance of the disc blades. After such a sensor assembly indicator records qualitative dimensional data (eccentricity and wobble), through at least one revolution of a disc blade, and compares it against a set datum point, a manufacturer can, using the recorded data, be alerted to a specific batch of faulty disc blades. Such notification of sub-standard disc blades will allow a manufacturer to adjust the disc blade formation process and remedy the problem before the faulty disc blades make their way to the consumer, thus insuring that the consumer of a quality product.

Therefore, the present disclosure helps to insure dimensional characterization of planter disc blades so as to efficiently and exactly provide customers with the best quality product and service possible.

This disclosure also helps to acquire statistical process data of dimensional characterization of planter disc blades and develop historical statistical data so as to provide a control for future QA/QC measurements.

The disclosure provides a checking fixture, with provisions for a mounting shaft and one or more sensor assembly indicator systems. In one embodiment, the checking fixture, made of metal or some other sufficiently rigid material, consists of an upright stand that is offset at an angle, such as a ninety-degree angle, with respect to a supportive base. It is contemplated that, based on this disclosure, one of ordinary skill in the art will understand that the stand may be offset from the base at angles other than ninety degrees.

The checking fixture also has provisions for a center mounting shaft, extending at an angle, such as ninety degrees, out from the upright stand. Such a center mounting shaft may accommodate any number of sized or shaped disc blade assembly bearings, including, but not limited to, rivet holes, square holes, round holes, cloverleaf holes, hexagonal holes, dual-square holes, etc. Additionally, the center mounting shaft may be located at any number of positions on the stand to accommodate disc blades with large or small diameters. For firmly securing a disc blade assembly upon the center mounting shaft, the center mounting shaft may use, but is not limited to, a first quick turn threaded nut.

A mount or gage plate of the checking fixture is detachably affixed, through a mechanism such as a hinge, and angularly offset at a ninety-degree angle from the top portion of the upright stand. It is contemplated that, based on this disclosure, one of ordinary skill in the art will understand that the gage plate may be offset from the stand at angles other than ninety degrees. The gage plate allows for hinged movement during placement of a disc blade assembly upon the checking fixture's center mounting shaft. In addition, the top gage plate has, detachably mounted upon it, using a second quick turn threaded nut, an eccentricity sensor assembly indicator and appropriate probe, such as a Mitutoyo Digimatic Indicator, for example.

The checking fixture also has, detachably mounted at a ninety-degree angle from the upright stand, at a predetermined position below a disc blade assembly's top edge, such as 0.25 inches, and along the disc blade assembly's face, a wobble sensor assembly indicator and appropriate probe, such as a Mitutoyo Digimatic Indicator. The wobble sensor assembly indicator may be detachably affixed using a third quick turn threaded nut. It is contemplated that, based on this disclosure, one of ordinary skill in the art will understand that the wobble sensor assembly indicator may be mounted at angles, other than ninety degrees, relative to the upright stand. It is also to be understood that both eccentricity and wobble sensor assemblies may be positioned at any position relative to certain specifications of a desired disc blade assembly.

Both the eccentricity and wobble sensor assemblies have an indicator and appropriate probe. The eccentricity sensor probe records variations in the radial (i.e. distance from a disc blade assembly's bearing to its outer edge) revolution of a disc blade assembly while the wobble sensor probe measures the wobble (i.e. side-to-side movement) of a disc blade assembly's path during at least one revolution. Accordingly, the eccentricity and wobble values may be measured against an original value of zero, which both sensor assembly indicators default to while at rest. Upon recording eccentricity and wobble values, the information is sent directly from each corresponding sensor assembly indicator into a multiplexer, such as a MUX- 10 Multiplexer, the details of which are herein incorporated by reference, and then channeled to and recorded on a computer, such as a Pentium II-based personal computer, using software applications such as Statistical Process Control "SPC" Real-Time, SPC Process Manager, SPC Process Analyzer, Gage Repeatability and Reproducibility, and MiniTab, all available for running on a Microsoft Windows-based platform. After collecting the data, the computer compares it against a prerecorded control, and prepares a report regarding a disc blade assembly's eccentrical and wobble properties. Upon the computer's comparison of the recorded eccentrical and wobble properties with the appropriate control properties, a generated report will indicate the desired characteristics of the disc blade assembly tested. Report information that shows a variation from the desired characteristics of the mounted disc blade assembly will alert a manufacturer to a specific batch of faulty disc blades, thus allowing it to remedy the problem before the product makes its way to the consumer, ultimately ensuring the consumer of a quality disc blade.

BRIEF DESCRIPTION OF THE DRAWINGS

The disclosure and the advantages thereof will become more apparent upon consideration of the following detailed description when taken in conjunction with the accompanying drawings.

DESCRIPTION OF THE DRAWINGS

Figure 1:
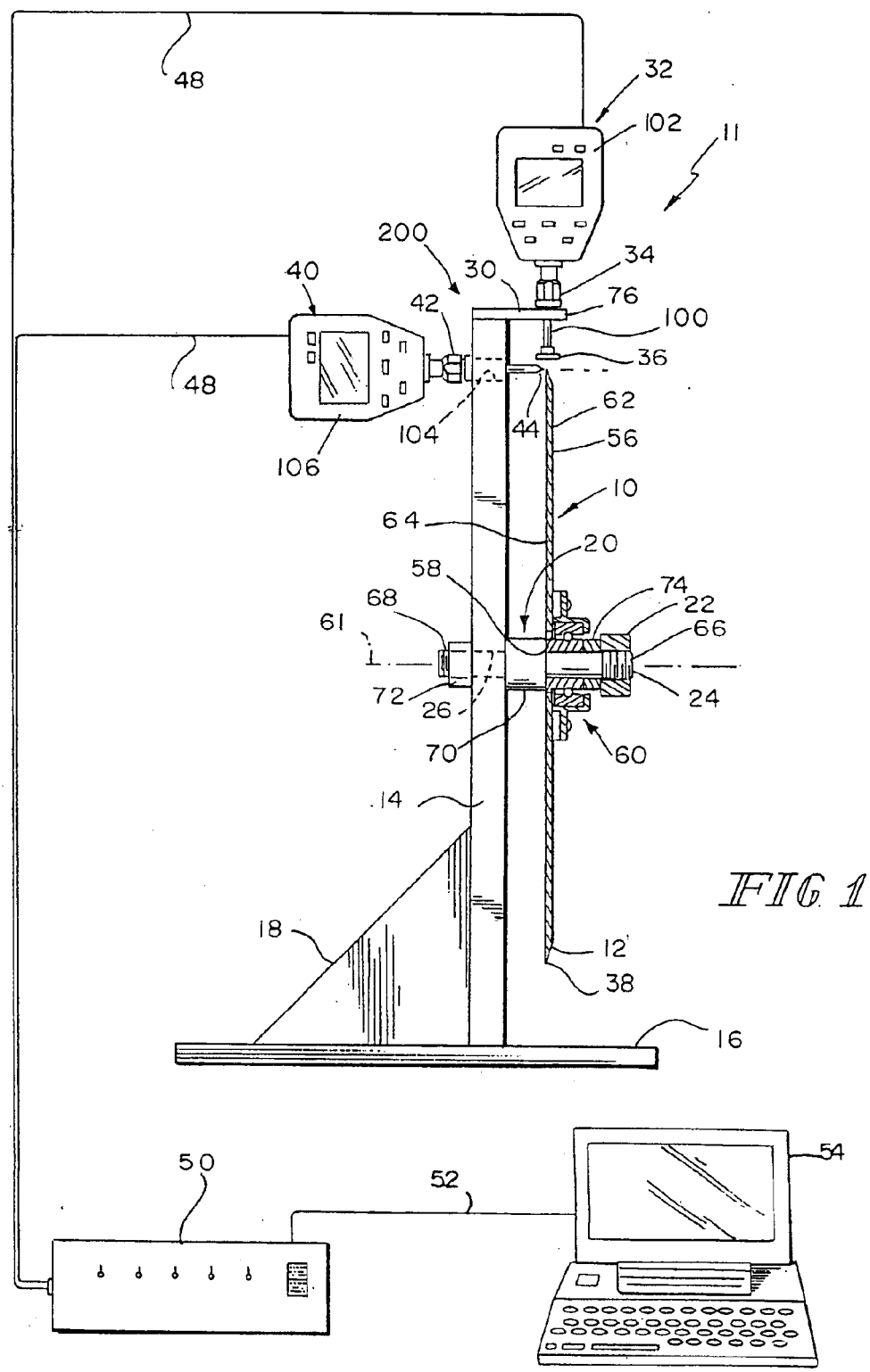
FIG. 1 is a diagrammatic front elevational view of a gage-eccentricity and wobble sensing device, illustrating a disc blade assembly mounted upon a checking fixture, and further illustrating corresponding eccentricity and wobble sensor assembly indicators of the device mounted to the stand for contact with the blade assembly.
Figure 2:
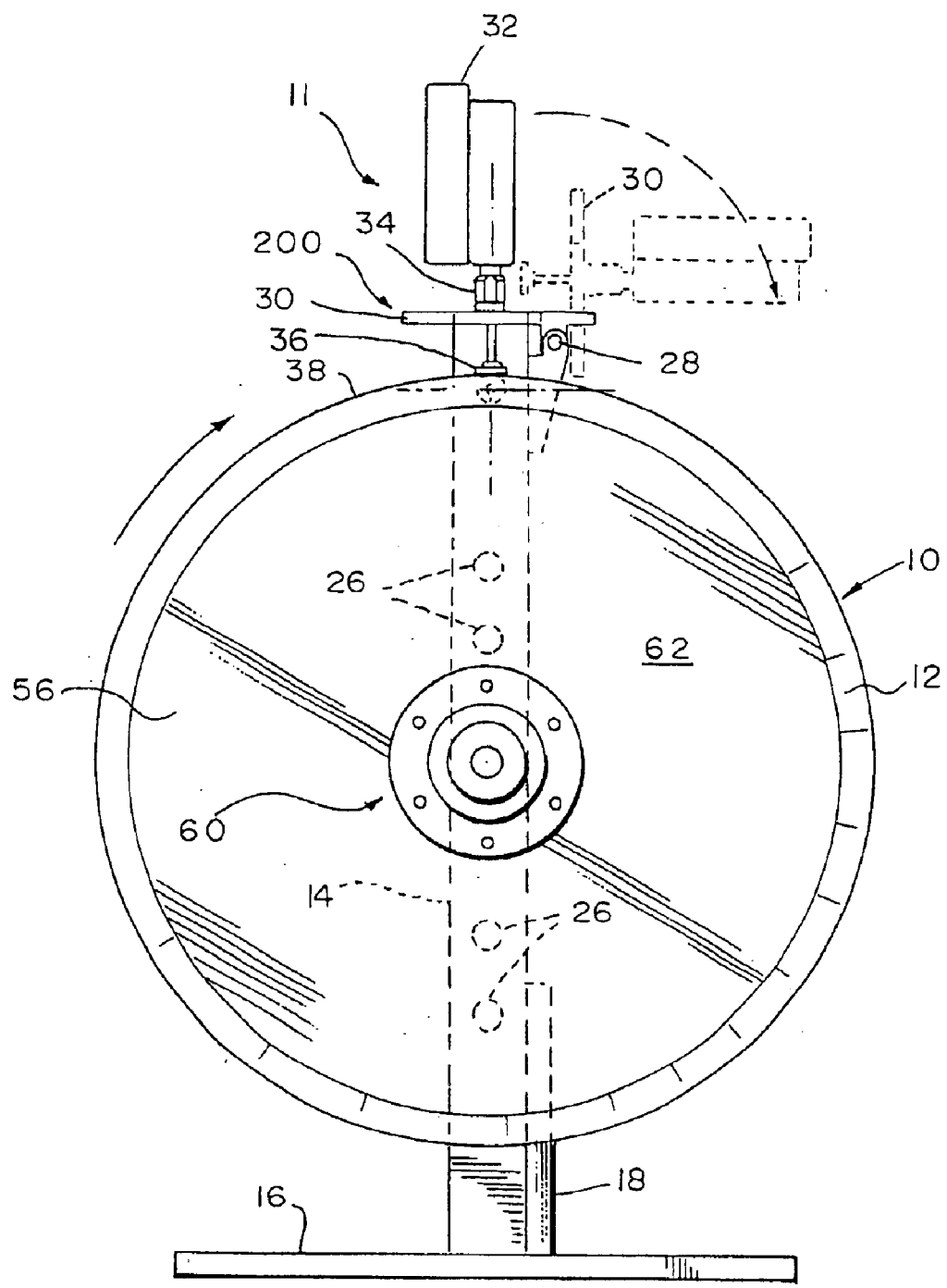
FIG. 2 is a diagrammatic side elevational view of the sensing device, illustrating the disc blade assembly mounted upon the checking fixture, and further illustrating the eccentricity sensor assembly indicator positioned in both an operational testing mode and a relaxed prone mode awaiting the mounting of a new test blade.

A device 11 is provided for sensing the eccentricity and wobble of an illustrative planter disc blade assembly 10 as shown in FIGS. 1 and 2. Planter disc blade assembly 10 includes a generally circular disc blade 56 having a central aperture 58 and a bearing 60 mounted to blade 56 about aperture 58. As is discussed in greater detail below, assembly 10 is mounted to device 11 for rotational movement about an axis 61 through aperture 58. Device 11 tests the quality of each blade 56 by measuring the eccentricity or shape, concavity, and diameter of blade 56 and by measuring any side-to-side movement, or wobble, of blade 56 throughout one revolution about axis 61. Therefore, device 11 generally automates the quality assurance and quality control testing of illustrative planter disc blade assemblies during the manufacturing process. Although device 11 is illustratively used to sense the eccentricity and wobble of planter disc blade assembly 10, it is within the scope of this disclosure for device 11 to be used to test the eccentricity and wobble of any other suitable test subject to which it is desirable to monitor the eccentricity and wobble thereof.

Planter disc blade assembly 10 is shown in accordance with preferred embodiments of the invention. For example, FIGS. 1 and 2 illustrate blade 56 having a beveled edge 12 and, as mentioned above, aperture 58 is generally centrally located through first and second faces 62, 64 of blade 56. Illustratively, bearing 60 is mounted to first face 62. Blade 56 is mounted upon a checking fixture 200 of device 11. The checking fixture 200 consists of a stand 14 made of a rigid material, such as metal, affixed to a base 16 at an angle such as ninety degrees. The present invention also contemplates that the stand 14 may also be detachably affixed to the base 16. Referring to FIG. 1, it is anticipated that a support 18 for the stand 14 with respect to the base 16 may be utilized to insure stability during the eccentricity and wobble sensing processes.

Checking fixture 200 further includes a shaft 20 coupled to and extending outwardly from stand 14, as shown in FIG. 1. Shaft 20 illustratively includes a threaded first end 66 and a threaded second end 68. Illustratively, shaft 20 extends from stand 14 at a ninety degree angle. As shown in FIG. 1, at least a portion of second end 68 is received through a central aperture or shaft hole 26 of stand 14 so that a collar portion 70 of shaft 20 abuts a front side of stand 14. A nut 72 is threaded on to second end 68 to abut a back side of stand 14 and to rigidly couple shaft 20 to stand 14. Illustratively, a majority of shaft 20 (including threaded first end 66) extends outwardly along axis 61 in a direction away from the front side of stand 14.

Shaft 20 is illustratively received within central aperture 26 of stand 14. However, stand 14 includes a plurality of other shaft holes or apertures 26, as shown in FIG. 2, for example. Shaft 20 is receivable within any of these holes so that device 11 may be used with disc blade assemblies having a variety of different sizes or diameters. Although device 11 is shown to include one central aperture 26 and four other shaft holes or apertures 26, it is within the scope of this disclosure to include any number of apertures for receiving shaft 20 in order to change a height of shaft 20 relative to stand 14 to accommodate generally any sized blade. It is further within the scope of this disclosure to include a stand 14 being adjustable upwardly and downwardly along its length to further accommodate blades of differing size.

As mentioned above, blade 56 includes a central aperture 58 for receiving at least a portion of threaded second end 68 of shaft 20 therethrough so that planter disc blade assembly 10 may be detachably mounted upon center shaft 20 (and thus checking fixture 200) which extends from stand 14 at an angle such as ninety degrees. Bearing 60 is generally press fit onto shaft 20 and allows blade assembly 10 to be rotatable about shaft 20 along axis 61. Illustratively, bearing 60 abuts collar 70 of shaft 20 so that blade 56 is spaced-apart from stand 14. Blade 56 may be secured to shaft 20 by a quick turn threaded nut 22 upon threaded portion 24 of center shaft 20 to firmly hold disc blade assembly 10 to the center shaft 20. Illustratively, a spacer 74 is provided between nut 22 and bearing 60. Accordingly, center shaft 20 may be adapted to fit any suitably sized aperture of disc blade assembly 10. As mentioned above, it is also contemplated, as shown in FIG. 2, that the checking fixture's 200 stand 14 may have supplemental center shaft holes 26 to accommodate any diameter or curvature of disc blade assembly 10.

Figure 3:
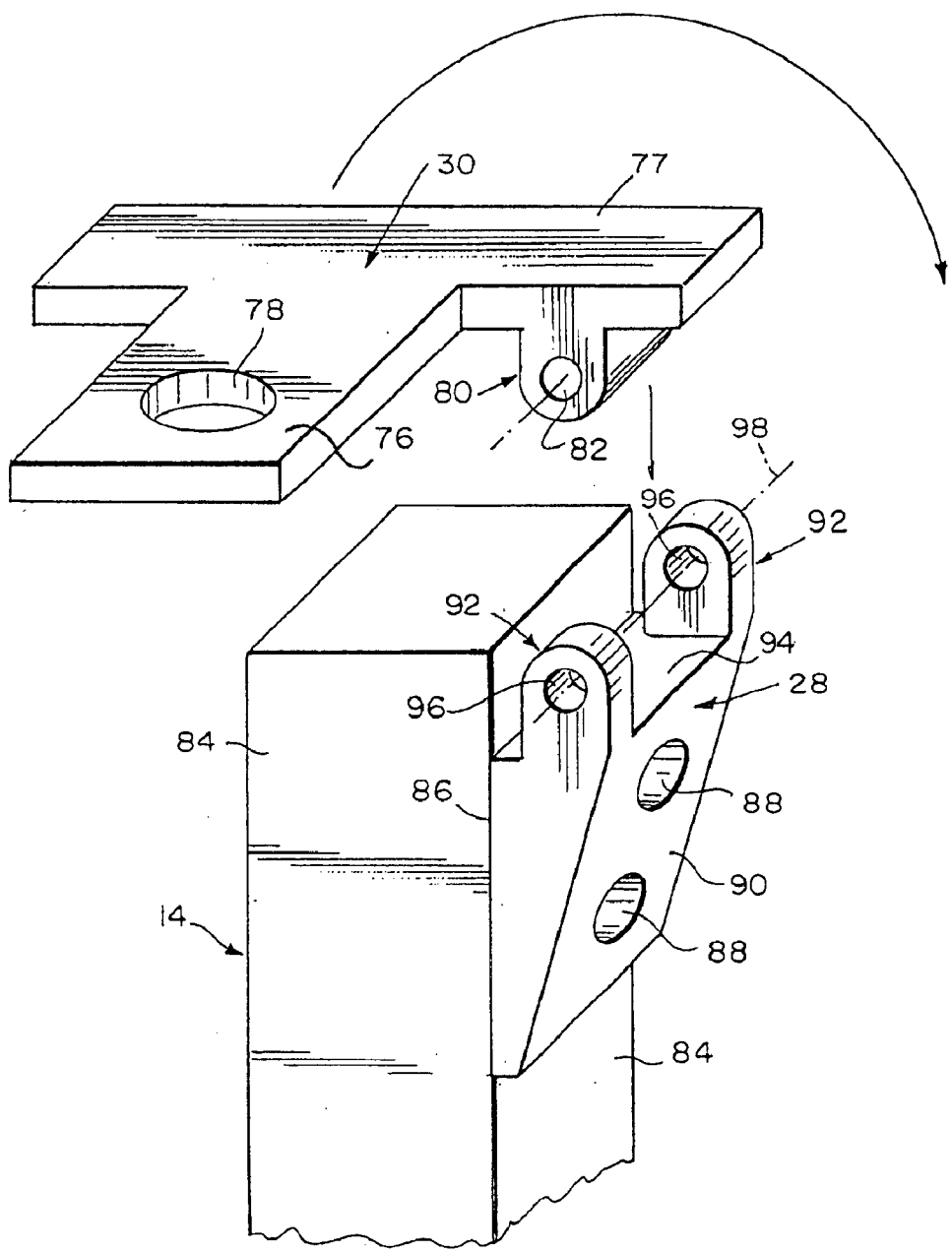
FIG. 3 is an exploded, perspective view of a portion of the device showing a stand of the checking fixture (with portions broken away), a hinge coupled to the stand, and a gage plate for attachment to the hinge for mounting the eccentricity sensor thereon to move the sensor between the operational testing mode and the relaxed prone mode.

Referring to FIGS. 1, 2, and 3, device 11 further includes a mount or gage plate 30 mounted to shaft 14 by a hinge 28 (shown in FIGS. 2 and 3). Hinged gage plate 30, therefore, is movable between an operational testing mode and a relaxed prone mode awaiting the mounting of a new test blade or disc assembly onto shaft 20. As shown in FIGS. 1 and 2, gage plate 30 is attached to an upper end of stand 14. Illustratively, as shown in FIG. 3, gage plate 30 includes an outwardly extending portion 76 having an aperture 78 formed therein and a generally horizontal portion 77 coupled to outwardly extending portion 76 so that illustrative gage plate 30 is generally "T-shaped". When gage plate 30 is mounted to stand 14, horizontal portion 77 is adjacent to and engaged with the top end of stand 14 and outwardly extending portion 76 extends beyond stand 14, as shown in FIG. 1. Gage plate 30 further includes a rounded pivot member 80 coupled to horizontal portion 77, as shown in FIG. 3. An aperture 82 is formed through pivot member 80 for receiving a pin (not shown) therethrough.

Hinge 28 is coupled to a side 84 of stand 14 at the top end of stand 14, as shown in FIG. 3. Illustrative hinge 28 includes a first side 86 adjacent to and engaged with side 84 of stand 14. Hinge 28 further includes holes 88 extending through hinge 28 from a second side 90 through hinge 28 to first side 86. Holes 88 are illustratively provided to receive a screw, bolt, or other fastener (not shown) therethrough to secure hinge 28 to stand 14. Hinge 28 further includes two spaced-apart tabs 92 extending above a top surface 94 of hinge 28, as shown in FIG. 3. Each tab 92 includes an aperture 96 formed therethrough.

Gage 30 is coupled to hinge 28 so that gage plate 30 may pivot about an axis 98 extending through each aperture 96 of tabs 92. Illustratively, pivot member 80 of gage plate 30 is received between spaced-apart tabs 92 of hinge 28 so that aperture 82 of pivot member 80 is aligned with each aperture 96 of tabs 92. A fastener, such as a pin, for example, or another suitable coupling member (not shown) is inserted through apertures 80 and 96 to couple gage plate 30 to hinge 28. Thus, as mentioned above, gage plate 30 is pivotable between the operational testing mode, where horizontal portion 77 of gage plate 30 is adjacent the top end of stand 14 so that gage plate 30 is in a generally horizontally situated, as shown in FIGS. 1, 2, and 3, and a relaxed prone mode awaiting the mounting of a new test blade, where gage plate is spaced apart from stand 14 and is generally vertically situated, as shown in FIG. 2. Illustratively, FIG. 2 shows gage plate 30 in both the operational testing mode and the relaxed prone mode.

Gage plate 30 has, mounted upon it, an eccentricity sensor assembly indicator 32 of device 11, such as a Mitutoyo Digimatic Indicator, for example. It is within the scope of this disclosure for device 11 to include any suitable eccentricity sensor for mounting upon gage plate 30. Further, it is within the scope of this disclosure for device 11 to include any suitable automated means for measuring eccentricity of a generally circular object, such as a disc blade assembly for example, including the use of a dial indicator (not shown), for example, such as those made by Mitutoyo, Inc. A dial indicator is a mechanical indicator and therefore would not be used with electronic recording devices such as multiplexer 50 and computer 54. Data from a dial indicator may be handwritten or otherwise manually recorded. Eccentricity sensor assembly indicator 32 may be mounted at an upright angle, such as ninety degrees, with respect to gage plate 30 and may be firmly, but detachably, affixed with a quick turn threaded nut 34. Eccentricity sensor assembly indicator 32 may have an appropriate plate-like probe 36 extending from it, which will make contact with the disc blade assembly outer edge 38 for the gathering of eccentricity data. Indicator 32 further includes an elongated member 100 generally positioned between and coupled to both the probe 36 and a digital display and interface member 102 of indicator 32. Illustratively, elongated member 100 is received at least in part through aperture 78 of gage plate 30. Indicator 32 is in a use or a "ready" position when gage plate is in the operational testing mode position. When indicator 32 is in the ready position, eccentricity assembly indicator 32 will be in an upright manner. However, during mounting of a disc blade assembly 10, gage plate 30 (with indicator 32) is pivoted about axis 98 to the relaxed prone mode to position the indicator in a prone position as well, as illustrated in FIG. 2.

In reference to FIG. 1, a wobble sensor assembly indicator 40 of device 11, such as a Mitutoyo Digimatic Indicator, can be seen to be detachably affixed to stand 14 in a prone position. It is within the scope of this disclosure for device 11 to include any suitable wobble sensor for mounting to stand 14 or to include any suitable automated means for measuring the wobble or concavity of a generally circular object. Wobble sensor assembly indicator 40 may be mounted at an angle with respect to stand 14, such as ninety degrees, either through an aperture 104 of stand 14, as shown in FIG. 1, or by being positioned and mounted adjacent to stand 14. The wobble sensor assembly indicator 40 may be firmly, but detachably, affixed to stand 14 with a quick turn threaded nut 42. Wobble sensor assembly indicator 40 may have an appropriate point-like probe 44 extending from it, which will make contact with the disc blade assembly face 64 for gathering of wobble data. Illustratively, probe 44 of wobble sensor assembly indicator 40 is positioned a distance of approximately 0.25 inches away from outer edge 38 of blade 56 in a direction toward shaft 20. Indicator 40, similar to indicator 32, also includes a digital display and interface member 106.

During eccentricity testing, as illustrated in FIG. 1, when a disc blade assembly 10 is spun at least one revolution about axis 61, eccentricity sensor assembly indicator 32 will make contact with the disc blade assembly outer edge 38 and will record any variations in the radius of blade 56 from the point of the disc blade assembly's 10 mount at the center shaft 20 to the disc blade assembly's 10 outer edge 38. Concurrently, during at least one revolution, wobble sensor assembly indicator 40 will make contact with the second face 64 of disc blade assembly 10 and will record any side-to-side movement of the disc blade assembly's 10 path.

After recording both eccentricity and wobble data, eccentricity sensor assembly indicator 32 and wobble sensor assembly indicator 40 will transmit the data, through direct feed lines 48, to a multiplexer 50 (shown in FIG. 1), such as a Multiplexer MUX-10, for example. Multiplexer 50, upon interleaving the two digital signals, will transmit the data through connecting cable 52 directly to computer 54. Here, the respective eccentricity and wobble values will be measured against prerecorded eccentricity and wobble controls relating to the type of disc blade assembly 10 mounted upon checking fixture 200. Illustrative computer 54 will then prepare a report regarding disc blade assembly's 10 eccentrical and wobble properties. The report will indicate, upon comparison to the relative control values, the desired eccentricity and wobble values for the respective disc blade assembly 10 mounted upon checking fixture 200. Such a report will allow a manufacturer to safeguard against shipment of a specific batch of faulty disc blades to the consumer, for example, ultimately ensuring the consumer of a quality product.

The foregoing description is for purposes of illustration only and is not intended to limit the scope of protection accorded this invention.

This disclosure will also conform to all QS and ISO requirements.

What is claimed is:

1. A wobble and eccentricity sensing device for use with a planter blade, the device comprising:
    a stand having a shaft adapted to mount the planter blade thereon for rotational movement of the planter blade about the shaft,
    a wobble indicator coupled to the stand and adapted to contact a face of the planter blade to measure the concavity and side to side movement of the planter blade as the planter blade rotates at least one revolution about the shaft; and
    an eccentricity indicator coupled to the stand and adapted to contact an outer edge of the planter blade to measure the eccentricity of the planter blade as the planter blade rotates at least one revolution about the shaft.

2. The device of claim 1, wherein the stand includes a plurality of apertures spaced along a length of the stand and the shaft is received at least in part within one of the apertures of the stand.

3. The device of claim 2, wherein the wobble indicator is received through one of the apertures of the stand spaced-apart from the aperture through which at least a portion of the shaft is received.

4. The device of claim 1, further including a mount coupled to the shaft and to the eccentricity indicator.

5. The device of claim 4, wherein the mount is coupled to a top end of the shaft and the eccentricity indicator is rigidly coupled to the mount.

6. The device of claim 5, wherein the mount includes an aperture configured to receive at least a portion of the eccentricity indicator therethrough.

7. The device of claim 5, wherein the mount is movable between a first position engaged with the stand and a second position spaced apart from the stand.

8. The device of claim 7, further including a hinge coupled to the stand and to the mount so that the mount pivots about an axis through the hinge and a portion of the mount.

9. The device of claim 7, wherein the plate generally perpendicular to the stand when the mount is in the first position, and wherein the mount is generally parallel to the stand when the mount is in the second position.

10. The device of claim 1, wherein the eccentricity indicator is movable relative to the stand between a first position adapted to contact the planter blade and a second position spaced-apart from the planter blade assembly.

11. The device of claim 1, further including a multiplexer coupled to the eccentricity indicator and to the whole indicator.

12. The device of claim 11, further including a computer coupled to the multiplexer.

13. Am assembly for measuring the eccentricity and wobble of a circular member mounted on the assembly for rotational movement relative to the assembly, the assembly comprising:
    a stand having a shaft mounted generally perpendicularly to the stand,
    a generally circular member including an aperture for receiving at least a portion of the shaft therethrough, an outer edge, and a first and second face, the member being rotatable about the shaft,
    a first indicator coupled to the stand and movable between a first position engaged with the outer edge of the member and a second position spaced apart from the member, the first indicator being configured to measure a distance between the shaft and the outer edge of the member, and
    a second indicator coupled to the stand and engaged with the second face of the member, the second indicator being configured to measure side-to-side movement of the member in a direction toward and away from the second indicators as the member rotates about the shaft.

14. The assembly of claim 13, wherein a distance between the first indicator and the shaft is adjustable.

15. The assembly of claim 14, wherein the stand includes a plurality of apertures each formed to receive at least a portion of the shaft therethrough so that the shaft may be positioned within any one of the apertures.

16. The assembly of claim 13, further including a hinged plate coupled to the first indicator and pivotable relative to the stand about an axis to move the first indicator between the first and second positions.

17. The assembly of claim 13, wherein the member includes a bearing positioned around the aperture of the member and press fit onto the shaft so that the member is rotable about the shaft.

18. A method of measuring the eccentricity and wobble of a planter blade assembly, the method including:
    placing the planter blade assembly onto a shaft so that a portion of the shaft is received through an aperture of the planter blade assembly to engage a wobble sensor,
    moving an eccentricity sensor from a first position spaced-apart from the planter blade assembly to a second position engaged with an outer edge of the planter blade assembly,
    setting the wobble and eccentricity sensors to zero, and
    rotating the planter blade assembly about the shaft.

19. The method of claim 18, further including transmitting the data recorded from each of the eccentricity and wobble sensors to a multiplexer to interleave a digital signal from each sensor.

20. The method of claim 19, further including transmitting the data through to a computer and measuring the data against prerecorded eccentricity and wobble controls relating to the disc blade assembly mounted on the shaft.

21. A wobble and eccentricity sensing device for use with rotatable disc, the device comprising:
    a stand having a shaft adapted to mount the disc thereon for rotational movement of the disc about the shaft,
    means for measuring the eccentricity of the disc,
    means for measuring the concavity of the disc, and
    means for adjusting a distance between the shaft and each of the means for measuring the eccentricity and means for measuring the concavity.

* * * * *